Aug. 13, 1968 G. HESKESTAD 3,396,738
FLUID GUIDING METHOD AND APPARATUS
Filed Nov. 27, 1964 3 Sheets-Sheet 1

INVENTOR.
Gunnar Heskestad
BY
Eli Weiss
ATTORNEY

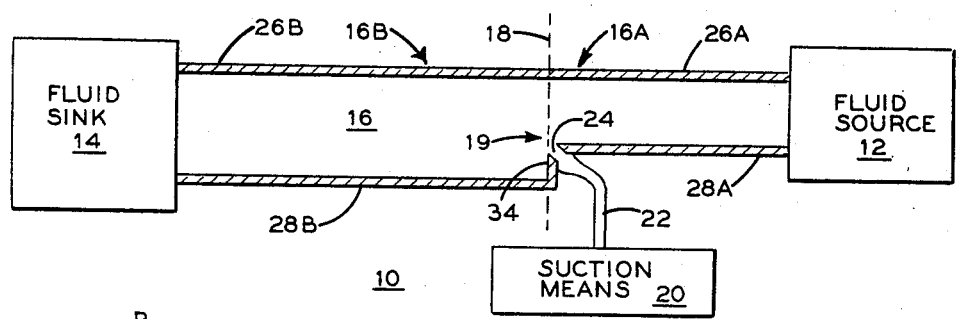
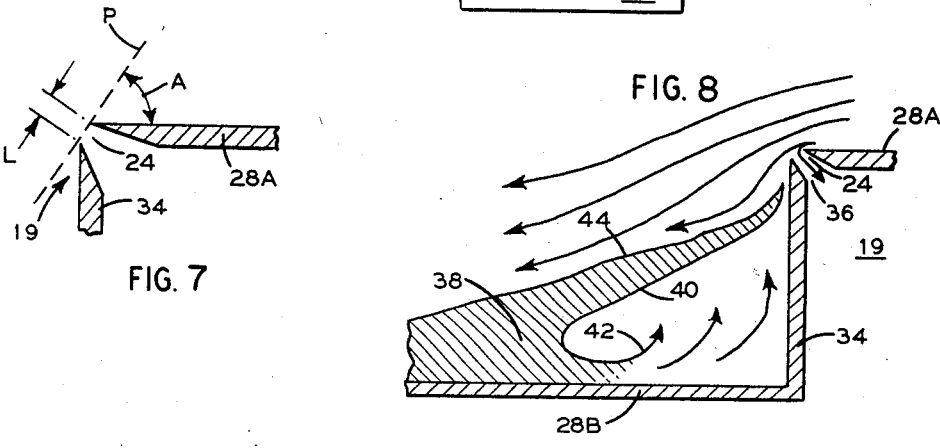
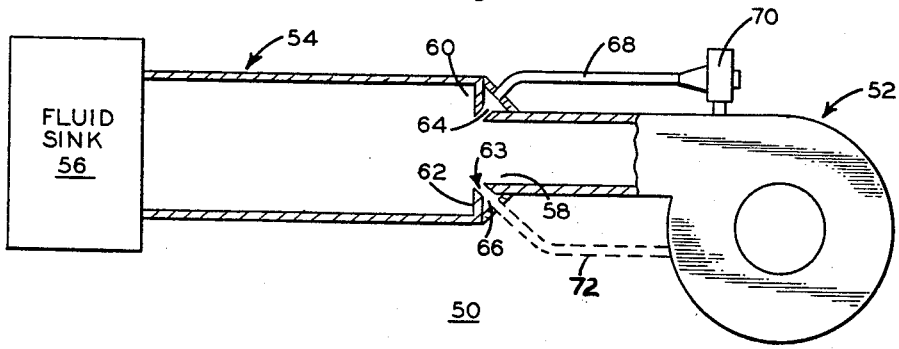
INVENTOR.
Gunnar Heskestad

United States Patent Office 3,396,738
Patented Aug. 13, 1968

3,396,738
FLUID GUIDING METHOD AND APPARATUS
Gunnar Heskestad, East Brunswick, N.J., assignor to American Standard Inc., a corporation of Delaware
Filed Nov. 27, 1964, Ser. No. 420,241
21 Claims. (Cl. 137—13)

ABSTRACT OF THE DISCLOSURE

Fluid is smoothly deflected around a step discontinuity in a fluid channel. There are essentially two ways in which a smooth deflection is accomplished. In the downstream section of the channel just beyond the discontinuity, there are suction means for removing a portion of the fluid. The suction means can be applied to an opening in the side wall of the channel to remove fluid from the core of a vortex, or applied to a transverse slot in the bottom wall of the channel to remove fluid as it enters the vortex. In the second way, fluid is removed from the flow at the peripheral edge of the step discontinuity.

---

This invention pertains to the moving of fluid through a channel which increases in size and more particularly to the moving of a fluid from one channel past or around an abrupt discontinuity to a larger channel with a reduction of normally occurring turbulence.

One of the many applications for guiding a fluid over and around a discontinuity in a surface is in channelling a fluid in a channel having a change in cross-sectional area. However, it is well known that the transition from a channel or duct having a small cross section to a channel or duct having a larger cross section is difficult to achieve from a fluid mechanical point of view. The flow deceleration and pressure increase generally require long, slowly tapering transition regions if good flow conditions and pressure recovery are to be obtained. If the transition is too abrupt or markedly discontinuous, fluid turbulences occur which distort fluid flow and dissipate fluid energy. Nevertheless, limited space availability quite often prevents the use of slowly, tapering transition regions and discontinuous changes in cross section must be utilized. Accordingly, the flow of fluid through channels with discontinuous cross sections occurs in many fluid conducting systems such as the ducting of gases and air in heating and air conditioning systems or moving gases in centrifugal pumps, blowers, etc.

In connection with centrifugal blowers, for example, the lack of adequate space makes unavoidable the use of a rapidly expanding flow cross section at the discharge of a blower. Heretofore, the flow losses were usually considerable and became more serious as the flow cross-sectional area increased. If the region of larger duct or channel containing a heating or cooling element, the uneven velocity distribution of the fluid within the duct and flow separation from the inner walls of the duct results in an ineffective use of the available heat transfer surfaces.

It is, accordingly, an object of the invention to improve the flow of fluid over a surface having a discontinuity.

It is another object of the invention to minimize energy losses in a fluid flowing in a channel which changes in flow cross section.

It is a further object of the invention to minimize turbulences of a fluid in a channel which abruptly increases in flow cross section.

It is still another object to provide a device which is reliable in operation and economical to build.

Briefly, the invention contemplates a fluid flowing over one side of a wall member which has a convex discontinuity. The fluid is deflected around the convex discontinuity by applying suction in the region of the discontinuity to withdraw a portion of the fluid passing over the discontinuity.

Other objects, and the features and advantages of the invention will be apparent from the following detailed description when read together with the accompanying drawing which shows, by way of example and not limitation, several embodiments of the invention.

In the drawing:

FIG. 6 shows a block diagram of a fluid flow system including a cross-sectional view of a fluid channel with a convex discontinuity for practicing the invention;

FIG. 7 is an enlarged cross-sectional view of the convex discontinuity of FIG. 6;

FIG. 8 is a fluid flow diagram showing the stream lines of the fluid flowing through the channel of FIG. 6; and FIG. 9 is a schematic representation, partially in cross section, of a blower-diffuser system incorporating the teachings of the invention.

Figure 1:
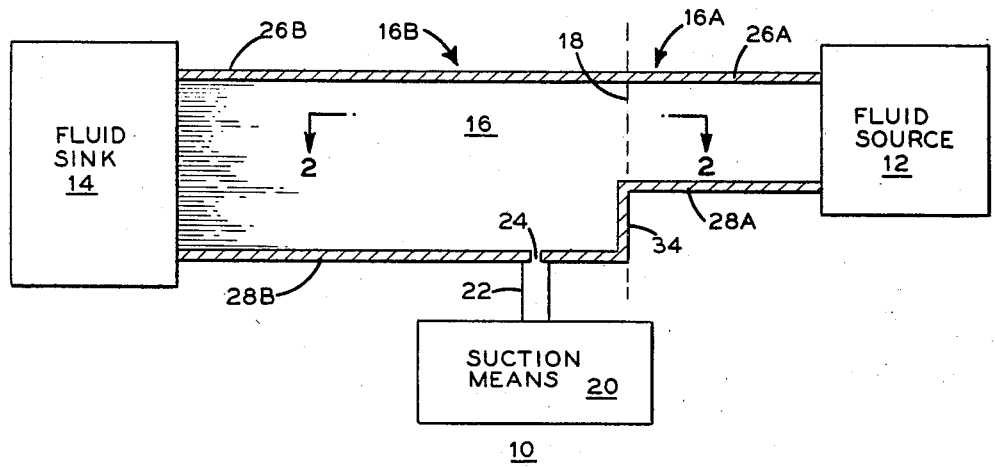
FIG. 1 shows a block diagram of a fluid flow system including a cross-sectional view of a fluid channel with a step discontinuity for practicing the invention.

Referring to FIG. 1, there is shown a fluid flow system 10 comprising a fluid source 12 such as a centrifugal blower whose outlet is connected via a fluid channel 16 to the inlet of a fluid sink 14. Fluid is driven from fluid source 12 into the first section 16A of channel 16. As the fluid passes the discontinuity region 18 the flow cross section expands and the fluid enters the second section 16B of channel 16. The fluid in section 16B enters fluid sink 14. Normally, when the fluid passes over the discontinuity 18 turbulences occur which are detrimental to smooth fluid flow. To minimize the turbulences downstream of discontinuity 18, a portion of the fluid flowing through section 16B is removed by suction means 20 connected via conduit 22 to an opening 24 in the section 16B of fluid channel 16. Such means 20 may be a centrifugal exhaust blower or pump.

Figure 2:
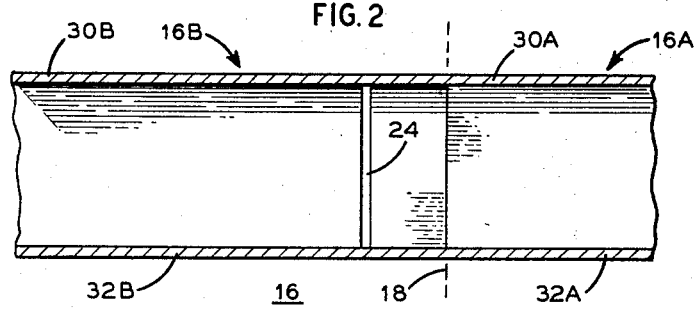
FIG. 2 is a cross-sectional view of the fluid channel taken along line 2—2 of FIG. 1.

More particularly, fluid channel 16 comprises: section 16A of rectangular cross section including a top wall 26A, a bottom wall 28A, a first side wall 30A and a second side wall 32A; and section 16B also of rectangular cross section, including a top wall 26B, a bottom wall 28B, a first side wall 30B and a second side wall 32B. As is apparent from FIGS. 1 and 2, the cross-sectional area of section 16B is greater than the cross-sectional area of section 16A and in particular, the height of the latter is less than the height of the former. Top walls 26 and side walls 30 and 32 at least abut at discontinuity 18 and are preferably unitary. For example, top wall 26 may be a continuous unitary sheet from fluid source 12 to fluid sink 14. However, because of the difference in the height of the sections 16A and 16B bottom walls 28 do not abut and an end wall 34 connects the oppositely disposed edges of the bottom walls. Therefore, the discontinuity 18 is a step discontinuity wherein the step is defined by bottom wall 28A, end wall 34 and bottom wall 28B.

Downstream from discontinuity 18 there is a slotlike opening 24 in bottom wall 28B. Opening 24 extends transversely across substantially the entire width of bottom wall 28B. Opening 24 is transverse to the longitudinal axis of fluid channel 16 which is the fluid flow axis.

Figure 3:
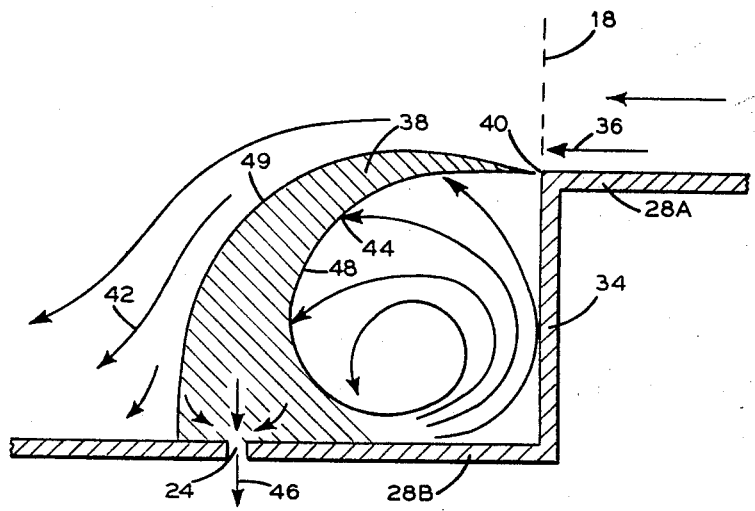
FIG. 3 is a fluid flow diagram showing the stream lines of fluid flowing through the channel of FIG. 1.

What is believed to be the stream lines of the flow of fluid in channel 16 will be described with respect to FIG. 3. Generally, the fluid travels from the right parallel to bottom wall 28A until the step discontinuity is reached. If the approaching boundary layer is laminar and the Reynolds number sufficiently high there is a transition to a free turbulent vortex layer 38 starting at lip 40 of the step discontinuity 18, and curls outward and downward from lip 40. The layer 38 spreads almost linearly in the local flow direction entraining fluid from both the exterior flow 42 and interior flow 44. Fluid 46 is extracted at opening 24 in an amount sufficient to remove fluid of the layer 38 less the amount of fluid recirculated as a result of the entrainment process taking place at the inner border 48 of layer 38. As long as sufficient fluid is extracted the vortex flow is maintained and the fluid beyond boundary 49 smoothly flows downstream.

Figure 4:
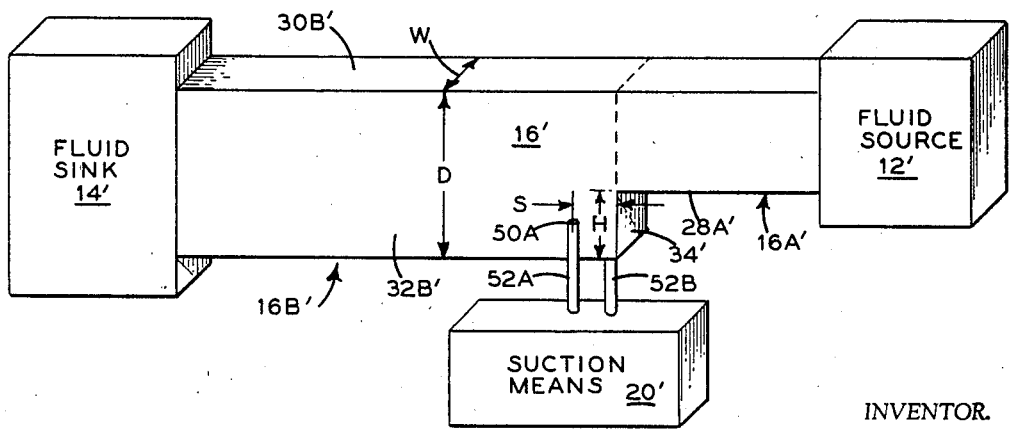
FIG. 4 is a perspective view, partially in schematic, of an alternate embodiment of the fluid flow system of FIG. 1.

In FIG. 4, there is shown an alternate embodiment of the system of FIG. 1. Since the systems are similar in many respects primed reference characters will be employed for like elements and only the differences will be described in detail. The main difference is concerned with removing fluid from section 16B'. The openings 50 are positioned a distance S downstream of end wall 34' and in the region below the horizontal projection of bottom wall 28A'.

Figure 5:
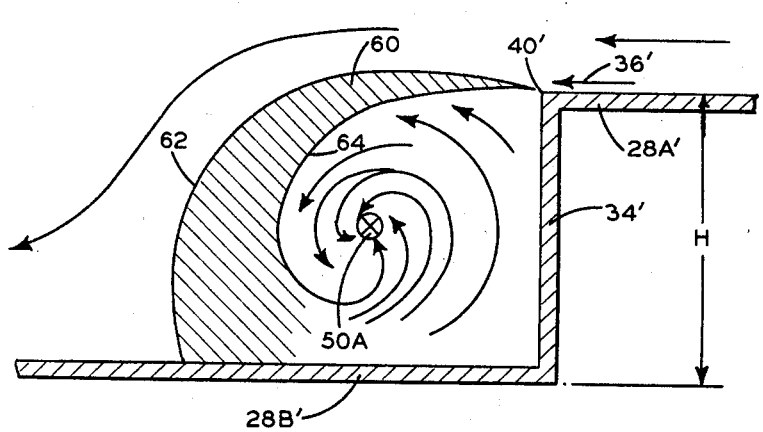
FIG. 5 is a fluid flow diagram associated with the embodiment of FIG. 4.

What is believed to be fluid flow within channel 16' will now be described with respect to FIG. 5. The fluid approaches from the right with a thin turbulent layer 36' adjacent bottom wall 28A'. As the layer 36' leaves lip 40' it continues as a free turbulent vortex layer 60 having boundaries 62 and 64. If the boundary layer 36' is laminar it is assumed that the Reynolds number is high enough so that there is a smooth transition at lip 40' to the vortex layer 60. Because of the removal of fluid by suction means 20' layer 60 curves outward and downward toward bottom wall 28B' while it spreads almost linearly in the local flow direction and entrains fluid from both the fluid exterior to boundary 62 and boundary 64. A line vortex is established with rotates about an axis transverse to the longitudinal axis of channel 16'. As long as the vortex flow is maintained, fluid beyond boundary 62 smoothly flows downstream. In order to maintain the line vortex the fluid drawn from openings 50 at the core of the vortex must be sufficient to remove fluid associated with the layer 60 when it reaches bottom wall 28B' less the amount of fluid recirculated as a result of the entrainment process taking place at the border 64. It has been found experimentally and theoretically that fluid should be drawn from the vortex by openings 50 at a rate equal to the flow in a fluid layer adjacent lip 40' wherein the layer has a thickness of 0.2 times the height H of the step at the discontinuity. Accordingly, the fluid removal rate should be greater if the velocity of the input fluid increases or if the width of the channel 16' increases. In other words, the removal rate of fluid from the vortex is directly proportional to the height of the step, the width of the step and the velocity of the input fluid.

By virtue of experiment, the following geometrical relationships have been determined for the embodiment of FIG. 4: (a) the height H of the step can be less than one-half of the height D of section 16B' (see FIG. 4); (b) the width W of the step (and also the channel) can be less than about ten times the height H of the step; and the distance S of the openings 50 from the end wall 34 can be from 0.5 to 1.0 times the height of the step.

For the embodiment of FIG. 1, the height H of the step is the same as for the embodiment of FIG. 4, the distance of the opening 24 from end wall 34 is substantially equal to H, and there is no limitation on the width of the step.

Referring to FIG. 6, there is shown a fluid flow system 10 comprising a fluid source 12 such as a centrifugal blower whose outlet is connected via a fluid channel 16 to the inlet of a fluid sink 14. Fluid is driven from fluid source 12 into the first section 16A of channel 16. As the fluid passes the discontinuity region 18 the flow cross section expands and the fluid enters fluid sink 14. Normally, when the fluid passes over the discontinuity region 18 turbulences occur which are detrimental to smooth fluid flow. To minimize the turbulences downstream of discontinuity region 18 by guiding fluid around the convex corner 19, a portion of the fluid flowing over convex corner 19 is removed by suction means 20 connected via conduit 22 to slit-like opening 24 in the edge of convex corner 19. Suction means 20 may be a centrifugal exhaust blower or pump. It has been found that good turbulence suppression has been obtained when suction means 20 draws off from one to two percent of the fluid flowing over convex corner 19.

More particularly, fluid channel 16 comprises: section 16A of rectangular cross section including a top wall 26A, a bottom wall 28A, and first and second side walls; and section 16B also of rectangular cross section, including a top wall 26B, a bottom wall 28B, and first and second side walls. As is apparent from FIG. 6, the cross-sectional area of section 16B is greater than the cross-sectional area of section 16A and in particular, the height of the latter is less than the height of the former. Top walls 26 and the side walls at least abut at discontinuity region 18 and are preferably unitary. For example, top wall 26 may be a continuous unitary sheet from fluid source 12 to fluid sink 14. However, because of the difference in the height of the sections 16A and 16B bottom walls 28 do not abut and and end wall 34 connects the oppositely disposed edges of the bottom walls. Therefore, the discontinuity region 18 has a step discontinuity wherein the step is defined by bottom wall 28A, end wall 34 and bottom wall 28B. Furthermore, the junction of end wall 34 and bottom wall 28A define a wall surface discontinuity in the form of convex corner 19. It should be understood that while a convex corner is shown, this invention is not limited to such configuration; and, that the term convex corner can be used to define a ramp surface (end wall 34 is at some angle other than 90° with the bottom walls 28) or a concave surface (end wall 34 being in the form of an arc).

Along the edge of convex corner 19 is a very narrow slit-like opening 24. The gap length L (FIG. 7) of opening 24 is preferably several hundredths of the height of end wall 34. In addition, it has been found the desired fluid deflection around convex corner 19 is influenced by the angle A, that is, the angle between the plane P connecting the edges of walls 28A and 34, defining opening 24 and bottom wall 28A. Angle A, hereinafter called the angle of inclination, is greater than 25° and less than 90° and preferably about 45°.

The fluid flow in the region of discontinuity 18 will now be discussed with respect to FIG. 8. Laminar flow proceeds from the right parallel to bottom wall 28A. A slight amount of the fluid 36 adjacent to convex corner 19 is drawn through opening 24. The remainder actually turns the corner and adheres to the inner surface of end wall 34 for a distance about equal to the gap length L before separating therefrom as a result of the adverse pressure gradient caused by fluid expansion. A turbulent mixing layer 38 starts developing at the point of separation, curves away from the face of wall 34 and spreads along a line of fairly constant slope until its re-attaches to the bottom wall 28B at a distance equal to twice the height of the step or less, i.e., the height of wall 34. The entrainment flow at the inner border 40 of the mixing layer originates near the re-attachment point causing the interior flow 42 to resemble a vortex. The flow beyond outer border 44 smoothly expands so that there is minimum turbulence beyond the discontinuity.

Referring now to FIG. 9, a blower-diffuser system 50 is shown comprising a centrifugal blower 52 driving air via a diffuser 54 to a fluid sink 56. Blower 52 has its outlet 58 connected to the inlet 60 of diffuser 54. Blower 52 is of the conical type and therefore has a circular cross-sectioned inlet 60. The outlet 58 of blower 52 is also of circular cross section but of saller diameter than of inlet 60 to the edge of outlet 58. Accordingly, an annular convex corner 63 is established between inlet 60 and outlet 58. Along the edge of the convex corner 63 there is a peripheral slit-like opening 64 leading to an annular chamber 66. Conduit 68 connects chamber 66 to suction blower 70. Alternately, a conduit 72 (shown in dotted lines) can connect chamber 66 to an opening in the casing of blower 52. Suction is therefore provided by the Bernoulli effect.

During operation fluid is driven by blower 52 via its outlet 58 through inlet 60 into diffuser 54. As the fluid moves over the annular convex corner 63 smooth expansion takes place by virtue of the above described phenomena resulting from the suction applied at opening 64. Hence, there is minimum turbulence in the fluid diffuser 54.

For proper operation the gap length opening 64 is about 0.005 times the diameter of the circular cross section of outlet 58 or greater.

There has thus been shown improvements in the channeling of fluid past a step discontinuity which by removing a portion of the fluid from a vortex downstream of the step permits the smooth expansion of the fluid flow cross section. In addition, there have been shown two methods of bleeding off a portion of the fluid in the vortex so that the vortex is maintained and does not degenerate into a turbulent downstream flow. Furthermore, there has also been disclosed two methods of bleeding off or removing a portion of the fluid flowing over the convex corner.

Obviously many modifications and variations of the present invention are possible in the light of the above teachings. It is, therefore, to be understood that within the scope of the appended claims the invention may be practiced otherwise than as specifically described.

What is claimed is:

1. The method of minimizing fluid turbulence in the flow of fluid over a step discontinuity in a channel, said step discontinuity creating a vortex having an axis of rotation transverse to the flow axis of said channel, said method consisting of removing a portion of the fluid from the channel in a region immediately downstream of the step discontinuity.

2. In a channel comprising a first section having a given cross-sectional area, and a second section downstream of said first section having a cross-sectional area of said first section wherein the junction of said first and second sections provide a step discontinuity in said channel, said step discontinuity creating a vortex having an axis of rotation transverse to the flow axis of said channel, the method of minimizing fluid turbulence in said second section by transversely removing a portion of the fluid from said second section downstream of the step discontinuity.

3. In a channel comprising a first section having a given cross-sectional area, and a second section downstream of said first section having a cross-sectional area greater than the cross-sectional area of said first section wherein the junction of said first and second sections provide a step discontinuity in said channel, the flow of fluid over said step discontinuity generating a vortex in said second section adjacent said step discontinuity, said vortex having an axis of rotation transverse to the flow axis of said channel, the method of minimizing fluid turbulence in said second section by continuously removing fluid from said vortex by suction applied to an opening immediately downstream of the step discontinuity.

4. A fluid channel comprising a first section including an inlet adapted to receive fluid under pressure, a second section including an outlet adapted to deliver fluid under pressure, said second section having a cross-sectional area greater than said first section so that there is a step discontinuity at the junction of said sections generating a vortex having an axis of rotation transverse to the flow axis of said channel; said second section being provided with an opening adjacent to said step discontinuity, and suction means connected to said opening for removing a portion of the fluid which flows through the second section of said channel whereby the fluid flowing into said second channel from said first channel over said step discontinuity has minimum turbulence.

5. The fluid channel of claim 4 wherein the height of the step between said first and second sections is less than one-half the height of said second section.

6. The fluid channel of claim 4 wherein said opening is positioned downstream from said step by a distance in the range of 0.5 to 1.0 times the height of the step between said first and second sections.

7. The fluid channel of claim 4 wherein the width of said section is less than ten times the height of the step between said first and second sections.

8. The fluid channel of claim 4 wherein said suction means removes fluid from said second section at a rate equal to the flow in a layer of fluid adjacent the edge of said step discontinuity which has a thickness substantially equal to 0.2 times the height of the step between said first and second sections.

9. The fluid channel of claim 4 wherein the bottom wall of said section is provided with a slot-like opening oriented transverse to the direction of fluid flow.

10. A fluid channel comprising a first section of rectangular cross section including a top wall, a bottom wall, and first and second side walls, said first section including an inlet end adapted to receive fluid, a second section of rectangular cross section including a top wall, a bottom wall, and first and second side walls, said second section including an outlet end adapted to deliver fluid, the width of said sections being substantially equal and the height of said second section being greater than the height of said first section, the top walls and the first and second side walls of said sections, respectively, in abutting relationship, an end wall connecting the bottom walls of said sections whereby a step discontinuity occurs along the bottom walls at the junction of said sections generating a vortex having an axis of rotation transverse to the flow axis in said channel, at least one of the walls of said second section being provided with an opening adjacent to and downstream of said step discontinuity, and suction means connected to said opening for removing a portion of the fluid which flows in said second section whereby the fluid flowing into said second channel from said first channel over said step discontinuity has minimum turbulence.

11. The fluid channel of claim 10 wherein at least one of said side walls of said second section is provided with an opening adjacent said step discontinuity at a height between the bottom walls of said first and second sections.

12. The method of deflecting a fluid flowing over one side of a wall member and around a corner discontinuity in said wall member generating a vortex having an axis of rotation transverse to the axis of flow of the fluid, consisting of applying suction at said corner discontinuity to withdraw a portion of the fluid passing over said corner discontinuity.

13. Fluid guiding means comprising a wall member past which fluid flows creating a vortex having an axis of rotation transverse to the direction of flow over said wall member, said wall member including a corner having a corner edge, said wall member being provided with a slit along said corner edge and suction means connected to said slit for drawing through said slit a portion of the fluid flowing past said corner edge so that the fluid flows around said corner edge with a minimum of turbulence.

14. Fluid guiding means comprising a wall member past which fluid flows, said wall member generating a substantially stagnant fluid pocket, said wall member including a corner discontinuity having a corner edge, said wall member being provided with a slit along said corner edge, the angle of inclination of said slit with respect to the portion of said wall member upstream of said corner edge being greater than 20° and suction means coupled to said slit for drawing through said slit a portion of the fluid flowing past said corner edge.

15. Fluid guiding means comprising a wall member past which fluid flows, said wall member generating a substantially stagnant fluid pocket, said wall member including a convex corner discontinuity having a corner edge, said wall member being provided with a slit along said corner edge, the angle of inclination of said slit with respect to the portion of said wall member upstream of said corner edge being substantially 45° and suction means connected to said slit for drawing through said slit a portion of the fluid flowing past said convex corner.

16. In a conduit comprising a first portion having a given cross-sectional area, and a second portion downstream of said first portion having a cross-sectional area greater than the cross-sectional area of said first portion wherein the junction of said first and second portions provide a step discontinuity in said channel producing a substantially stagnant fluid region, the method of minimizing fluid turbulence in said second portion by removing at the edge of said step discontinuity a portion of the fluid flowing thereover.

17. A fluid channel comprising a first section of rectangular cross-section including a top wall, a bottom wall, and first and second side walls, said first section including an inlet end adapted to receive fluid, a second section of rectangular cross section including a top wall, a bottom wall, and first and second side walls, said second section including an outlet end adapted to deliver fluid, the width of said first and second sections being substantially equal and the height of said second section being greater than the height of said first section, the top walls and the first and second side walls of said sections, respectively, in abutting relationship, an end wall connecting the bottom walls of said sections whereby a step discontinuity occurs along the bottom walls at the junction of said sections producing a substantially stagnant fluid pocket, a slit-like outlet disposed along the junction of said end wall and the bottom wall of said first section, and suction means connected to said slit-like outlet for removing a portion of the fluid flowing over said step discontinuity.

18. The channel of claim 17 wherein the angle of inclination of said slit-like outlet with respect to the bottom wall of said first section is greater than 25°.

19. The channel of claim 17 wherein the angle of inclination of said slit-like outlet with respect to the bottom wall of said first section is substantially equal to 45°.

20. A blower-diffuser system comprising fluid blower means including an outlet of given cross section, a diffuser including an inlet having a cross section greater than the cross section of the outlet of said fluid blower, the outlet of said fluid blower being axially adjacent the inlet of said diffuser, a wall member connecting the edge of the inlet of said diffuser to the edge of the outlet of said fluid blower, said wall member creating a substantially stagnant region, a slit-like outlet provided in the junction of the edge of the outlet of said fluid blower and said wall member, and suction means connected to said slit-like outlet for removing a portion of the fluid flowing from the outlet of said fluid blower to the inlet of said fluid diffuser.

21. A blower-diffuser system comprising fluid blower means including an outlet of given cross section, a diffuser including an inlet having a cross section greater than the cross section of the outlet of said fluid blower, the outlet of said fluid blower being axially adjacent the inlet of said diffuser, a wall member connecting the edge of the inlet of said diffuser to the edge of the outlet of said fluid blower, said wall member producing a substantially stagnant fluid region, a slit-like outlet provided in the junction of the edge of the outlet of said fluid blower and said wall member, a chamber surrounding said slit-like outlet and a conduit connecting said chamber to a low-pressure region within said blower for removing a portion of the fluid flowing from the outlet of said fluid blower to the inlet of said fluid diffuser.

References Cited

UNITED STATES PATENTS

| | | | |
|---|---|---|---|
| 2,408,632 | 10/1946 | Griffith | 244—40 |
| 2,721,715 | 10/1955 | Hoadley | 244—130 |
| 2,590,797 | 3/1952 | Siciliano | 138—39 |
| 2,788,719 | 4/1957 | Bennett | 137—599 X |
| 2,841,182 | 7/1958 | Scala. | |
| 2,894,703 | 7/1959 | Hazen et al. | 137—81.5 X |
| 2,948,148 | 8/1960 | D'Antreville et al. | |
| 3,182,674 | 5/1965 | Horton | 137—81.5 X |
| 3,212,515 | 10/1965 | Zisfein et al. | 137—81.5 |
| 3,216,455 | 11/1965 | Cornell et al. | 138—39 |

SAMUEL SCOTT, *Primary Examiner.*